US009572097B2

(12) United States Patent
Anderson et al.

(10) Patent No.: US 9,572,097 B2
(45) Date of Patent: Feb. 14, 2017

(54) DETERMINING A PREFERRED WIFI HOTSPOT

(71) Applicant: International Business Machines Corporation, Armonk, NY (US)

(72) Inventors: Jason L. Anderson, San Jose, CA (US); Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Amonk, NY (US)

( * ) Notice: Subject to any disclaimer, the term of this patent is extended or adjusted under 35 U.S.C. 154(b) by 20 days.

(21) Appl. No.: 14/512,812

(22) Filed: Oct. 13, 2014

(65) Prior Publication Data

US 2016/0105846 A1 Apr. 14, 2016

(51) Int. Cl.
*H04W 48/20* (2009.01)
*H04W 48/16* (2009.01)
*H04W 84/12* (2009.01)

(52) U.S. Cl.
CPC ............. *H04W 48/20* (2013.01); *H04W 48/16* (2013.01); *H04W 84/12* (2013.01)

(58) Field of Classification Search
CPC ....... H04W 48/18; H04W 48/20; H04W 48/16
USPC .................................................. 370/338, 331
See application file for complete search history.

(56) References Cited

U.S. PATENT DOCUMENTS

| | | | |
|---|---|---|---|
| 2006/0047829 | A1 | 3/2006 | Acharya et al. |
| 2007/0100650 | A1 | 5/2007 | Ramer et al. |
| 2011/0286428 | A1 | 11/2011 | Souissi |
| 2012/0324092 | A1 | 12/2012 | Brown et al. |
| 2013/0007853 | A1* | 1/2013 | Gupta ................... H04W 12/06 726/5 |

(Continued)

FOREIGN PATENT DOCUMENTS

WO 2013122597 A1 8/2013

OTHER PUBLICATIONS

Abowd, George D. et al., "Context-Aware Computing", Pervasive Computing, IEEE 2002.

(Continued)

*Primary Examiner* — Jamal Javaid
(74) *Attorney, Agent, or Firm* — Matthew H. Chung; Christopher K. Mclane (57) ABSTRACT

A method of determining preferred WIFI hotspots. The method includes the steps of: detecting, by a computer processor, an attempt to connect to a first WIFI hotspot by a wireless device in a first area; and in response to detecting the attempt to connect to the first WIFI hotspot: identifying, by the computer processor, at least one bandwidth requirement of the wireless device; determining, by the computer processor, preferences based on contextual information corresponding to the wireless device and its user; collecting, by the computer processor, a plurality of WIFI hotspots available in the first area and identify prices and network bandwidth offered by each of the plurality of WIFI hotspots; and recommending, by the computer processor, preferred WIFI hotspots in the first area based on the identified bandwidth requirements, the determined preferences, and the process and network bandwidth offered by each of the plurality of WIFI hotspots.

15 Claims, 7 Drawing Sheets

(56) References Cited

U.S. PATENT DOCUMENTS

| | | | |
|---|---|---|---|
| 2013/0130642 A1 | 5/2013 | Joul et al. | |
| 2014/0079022 A1* | 3/2014 | Wang | H04W 36/22 370/331 |
| 2014/0286180 A1 | 9/2014 | Eng et al. | |
| 2014/0287751 A1* | 9/2014 | Lee | H04W 48/16 455/434 |

OTHER PUBLICATIONS

"Wi-Fi . . . Internet Without Wires", http://www.youcanworkfromanywhere.com/wi-fi/, printed Nov. 8, 2013.
Jones, Keith, "Building a Context-Aware Service Architecture", IBM Corporation developerWorks, Dec. 12, 2008.
Lei, Hui et al, "Context-Aware Unified Communication" Proceedings of the 2004 International Conference on Mobile Data Management, IEEE 2004.
"Method and System to Provide a Secure Service Advertising Protocol for Advertising Services from a Cloud Computing Infrastructure" IP.com, IPCOM000194952D, Apr. 15, 2010.
"Real Time Display and Customer Negotiation of Features and Price of Cloud Services Utilizing Appliance Based Resources" IP.com, IPCOM000226465D, Apr. 4, 2013.
Yu, Seung Min et al., "Price War in Wireless Access Networks: A Regulation for Convergence", IEEE, 2011.
"Improvements in Wireless Technology", IP.com, IPCOM000225257D, Feb. 4, 2013.
"A Mobile Device for Multi-Person Voice Chat Operating on a Local Wireless Mesh Network with Access to a Carrier-Independent External Chat Service Through a Hotspot", IP.com, IPCOM000130451D, Nov. 9, 2005.
"Indoor Positioning System", http://en.wikipedia.org/wiki/Indoor_positioning_system, Printed Oct. 9, 2014.

* cited by examiner

```
wifiSelection (workloads , calendar , wifiNetworks )
    # Get time histogram
    timeWindow = calendar . getEstimatedTimeAtLocation (location ) #See function
    and figures below

# Get choice data amounts
    minRequiredData = workloads . dataRequiredForNextTransition () #See figure
    below
    all Data = workloads . all Data ()

# Get choices
    choice1 = wifiNetworks . selectCheapestForDataInTimeWindow (minRequiredData ,
    timeWindow ) # See function below
    choice2 = wifiNetworks . selectCheapestForDataInTimeWindow (allData ,
    timeWindow )

. . .
        . . .
        . . .

return choices
```

602
```
getEstimatedTimeAtLocation (calendar, location)
    absTime = calendar . timeUntilNextMeetingAtNewLocation (location )
    timeHistogram = ( (absTime/25) - 4 . 5) ^2 # Or proportional
    return timeHistogram
```

604
```
selectCheapestForDataInTimeWindow (wifiNetworks, dataAmount, timeWindow)
    selectedWN=null
    cheapestCost=0
    for each wifiNetwork , wn
        if wn . canSupportDataInTimeWindow (dataAmount, timeWindow)
            cost = wn . cost
            if (selectedWN==null) OR (selectedWN <> null AND cost < cheapestCost)
                selectedWN = wn
                cheapestCost = cost
    return selectedWN
```

DETERMINING A PREFERRED WIFI HOTSPOT

FIELD OF THE INVENTION

The present invention relates generally to computer networks and in particular to wireless access to computer networks. More particularly, the present invention relates to a method, system, and computer program product for determining a preferred WIFI hotspot based on the context in which a wireless device is used.

BACKGROUND OF THE INVENTION

Wireless computer networks are increasingly being implemented and used as computer (and other device) users become more and more mobile. Wireless fidelity ("WIFI") networks, in particular, have seen a surge in consumer use and have become the most widely utilized standard for wireless networking. WIFI networks operate according to Institute of Electrical and Electronic Engineers ("IEEE") 802.11 standard, which is supported by most hardware vendors. These WIFI networks typically have an indoor range of one hundred and fifty to three hundred feet, with performance likely to degrade as the distance increases. Also, typical outdoor ranges for these WIFI networks are approximately one thousand feet. The strength and performance of the outdoor WIFI network typically also degrade as the distance increases, depending also on a number of factors such as atmosphere conditions and physical obstructions.

In order to provide distributed wireless access to a network, network service providers typically provide a plurality of geographically-dispersed wireless access ports. These wireless access ports provide WIFI access points that allow computer users to access the Internet via laptop and/or hand-held (or portable) computers/devices, such as personal digital assistants (PDAs), smart phones, cellular phones, and the like. These WIFI access points are referred to as "hotspots" and are currently located in many airports, hotels, restaurants, coffee shops and convention centers, for example.

As used herein, the term hotspot refers to the area extending from the wireless access port within which the wireless signal is broadcasted and can be detected by a wireless-enabled/capable user device. Hotspot based wireless services are provided by adhoc networks using short-range wireless systems, such as Bluetooth, 802.11 and wireless local area network (WLAN) technology/protocol and provide proximity-based wireless services to mobile terminals at the associated hotspots. The short range wireless systems are provided via a hotspot access point/port or hotspot server. Each working wireless access port thus emits a wireless signal recognized by wireless-capable mobile devices. The wireless devices then latch onto the wireless signals and are able to access the network via a series of authentication procedures with the background network, depending on whether the network is openly available (or free) or requires some form of payment or subscription.

SUMMARY OF THE INVENTION

One aspect of the present invention provides a method of determining preferred WIFI hotspots. The method includes: detecting, by a computer processor, an attempt to connect to a first WIFI hotspot by a wireless device in a first area; and in response to detecting the attempt to connect to the first WIFI hotspot: identifying, by the computer processor, at least one bandwidth requirement of the wireless device; determining, by the computer processor, preferences based on contextual information corresponding to the wireless device and its user; collecting, by the computer processor, a plurality of WIFI hotspots available in the first area and identify prices and network bandwidth offered by each of the plurality of WIFI hotspots; and recommending, by the computer processor, preferred WIFI hotspots in the first area based on the identified bandwidth requirements, the determined preferences, and the process and network bandwidth offered by each of the plurality of WIFI hotspots.

Another aspect of the present invention provides a method of determining preferred WIFI hotspots based on estimated network bandwidth for each of the available WIFI hotspots. The method includes: receiving, by a computer processor, a set of anonymous bandwidth information, where each of the set of anonymous bandwidth information is associated with each of a plurality of available WIFI hotspots; detecting, by the computer processor, a wireless device entering a first area; receiving, by the computer processor, a location of the wireless device in the first area; determining, by the computer processor, at least one location corresponding to each of the plurality of available WIFI hotspots, where the at least one location substantially matches the received location of the wireless device; identifying, by the computer processor, a set of estimated bandwidth metrics for each of the at least one determined location; identifying, by the computer processor, bandwidth requirements of the wireless device; determining, by the computer processor, preferences based on contextual information corresponding to the wireless device and its user; and recommending, by the computer processor, preferred WIFI hotspots in the first area, based on the identified bandwidth requirements, the determined preferences, and the identified set of estimated bandwidth metrics corresponding to the at least one determined location.

A third aspect of the present invention provides a computer program product for determining preferred WIFI hotspots. The computer program product includes: one or more computer readable storage medium and program instructions stored on the one or more computer readable storage medium, the program instructions including: program instructions to detect an attempt to connect to a first WIFI hotspot by a wireless device in a first area; program instructions to identify at least one bandwidth requirement of the wireless device, in response to detecting the attempt to connect to the first WIFI hotspot; program instructions to determine preferences based on contextual information corresponding to the wireless device and its user, in response to detecting the attempt to connect to the first WIFI hotspot; program instructions to collect a plurality of WIFI hotspots available in the first area and identify prices and network bandwidth offered by each of the plurality of WIFI hotspots, in response to detecting the attempt to connect to the first WIFI hotspot; and program instructions to recommend preferred WIFI hotspots in the first area based on the identified bandwidth requirements, the determined preferences, and the process and network bandwidth offered by each of the plurality of WIFI hotspots.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings.

DETAILED DESCRIPTION

Overview

Embodiments of the present invention analyze WIFI parameters specific to the context in which a wireless device is used and automatically provide a set of preferred WIFI hotspots. In particular, embodiments of the present invention evaluate a plurality of factors such as pricing, connection speed, and connection duration in order to provide an optimal user connectivity experience and potentially reduce network subscription fees.

In one embodiment, wireless feature of a wireless device ("wireless feature") extracts various parameters associated with the user and his or her wireless device and determines the most preferred network based on the extracted parameters. The wireless feature aggregates bandwidth requirements of the wireless device in response to the user attempting to establish a connection with a WIFI hotspot available in an area. Further, the wireless feature may evaluate user's social network and private calendars as well as the user's recent purchase history to determine how long the user will stay in an area where WIFI hotspots are available.

An example illustrating embodiments of the present invention is provided as follows. A user arrives at a gate of an airport with only 20 minutes before boarding. In the gate, there are three WIFI hotspots available, but the user does not know how much each of the WIFI hotspots cost or which hotspots will provide the fastest network speeds. In this example, the user plans to download a movie before her 12-hour international flight. As she identifies the three WIFI hotspots, an embodiment of the present invention receives her calendar data (i.e., that she has only 20 minutes before boarding) and past purchase history and discovers that she purchased a movie 20 minutes earlier. The embodiment of the present invention then determines that the remaining size of the movie file that requires downloading and evaluates each of the three WIFI SSID headers to identify the cost and available bandwidth associated with each of them. Finally, the embodiment of the present invention recommends a WIFI hotspot that provides sufficient bandwidth for the user to complete the download before she boards the plane and go offline. In this example, embodiment of the present invention may present additional options to the user if it is determined—using calendar look up and flight information—that there exists a fourth WIFI hotspot in the airplane, the fourth WIFI hotspot providing an acceptable speed that allows the user to download the remaining portion of the movie.

Thus, the embodiments of the present invention provide the user with the ability to make an optimized selection based on price, throughput, planned activities, and planned duration.

Using known techniques that provide wireless connections to a user, a WIFI hotspot's information is often represented by its service set identifier ("SSID") availability, network strength, and password lock. As used herein, SSID is a case sensitive, 32 alphanumeric character unique identifier attached to the header of packets sent over a wireless local-area network ("WLAN") that differentiates one WLAN from another, so all access points and all devices attempting to connect to a specific WLAN must use the same SSID to enable effective roaming. There are, however, additional information a user may need when choosing a desired WIFI hotspot. For instance, the user may need network bandwidth for each of the available hotspots and subscription prices for each of them to reach an informed decision. To identify the additional types of information, a user must actually establish and authenticate connection with a particular WIFI hotspot. In response, the WIFI hotspot may display pricing information via a returned HTML page. To identify network bandwidth, the user similarly must first establish and authenticate connection with the WIFI hotspot and subsequently run a test to determine its network transfer speed. This problem is only exacerbated with a growing number of WIFI hotspots causing a user to establish and authenticate to each WIFI hotspot before making a decision as to which hotspot should be used. At least one of these challenges is overcome by one or more embodiments of the present invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

System for Determining a Preferred WIFI Hotspot

Figure 1:
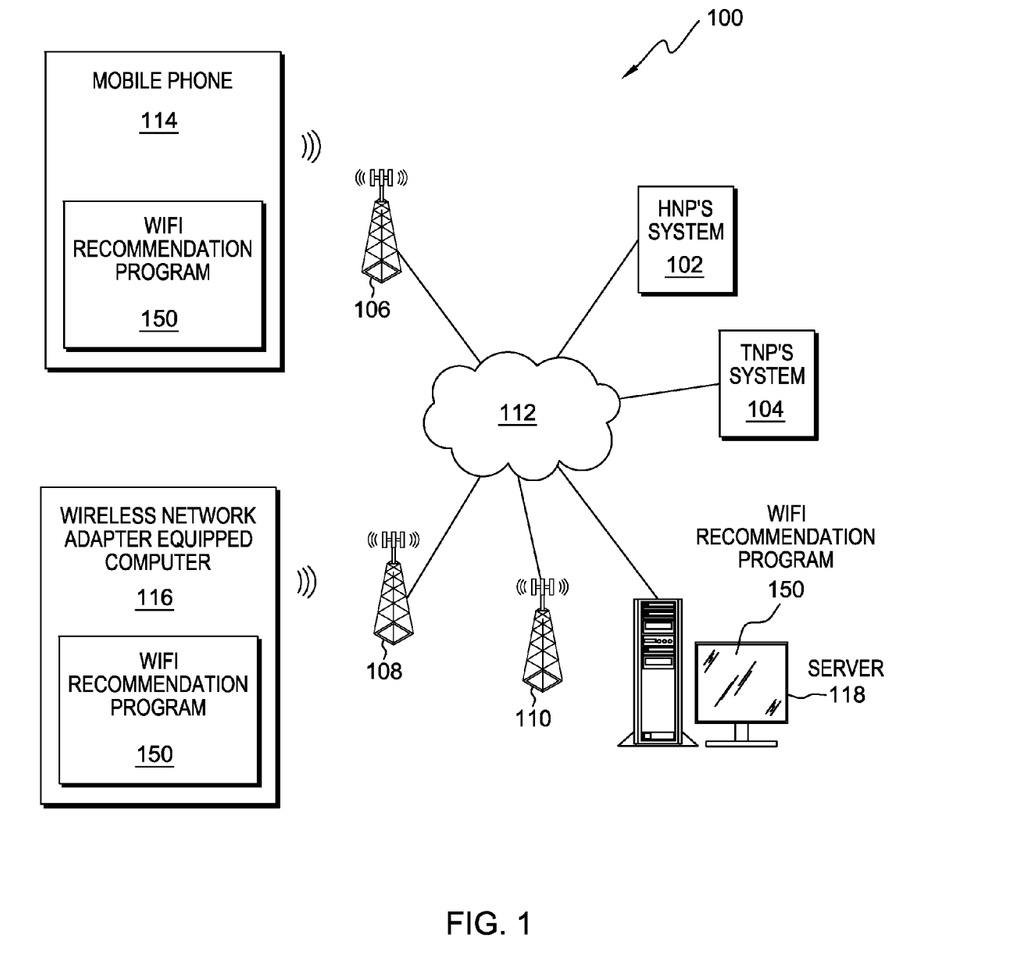
FIG. 1 illustrates a computer network having a Provider, multiple geographically dispersed hotspots and one of more enhanced mobile devices in which illustrative embodiments may be implemented.
Figure 2:
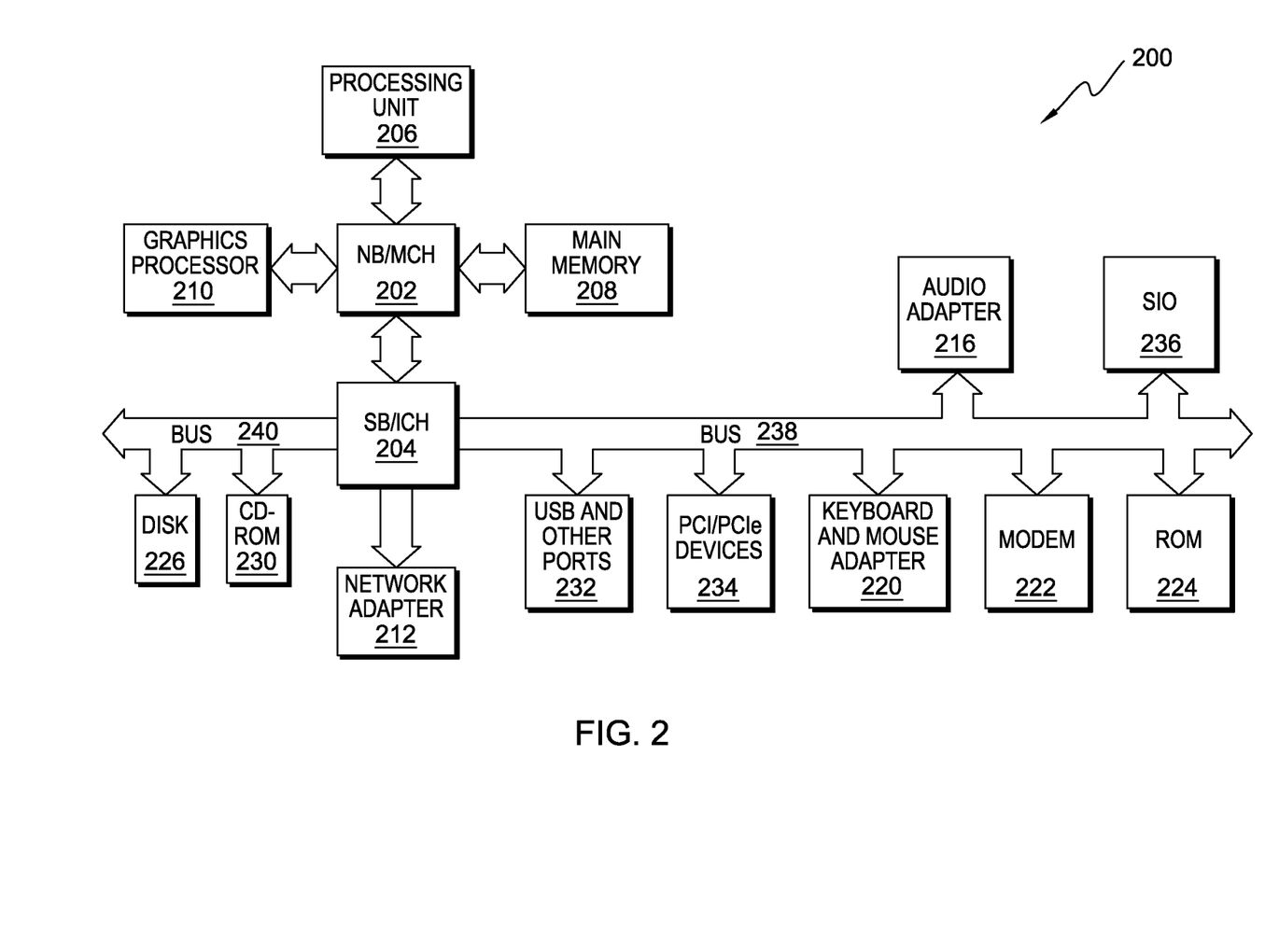
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a wireless communication environment in which an illustrative embodiment may be implemented. As an example, environment 100 includes two network providers depicted by home network provider's system 102 and transient network provider's system 104. Home network provider' system 102 may provide wireless services for the home network using radio transceiver 106. Transient network provider's system 104 may provide wireless services on a transient network using radio transceivers 108 and 110. A cellular base station and a wireless access point are some examples of radio transceivers 106, 108, and 110.

Home network provider's system 102 and transient network provider's system 104 may communicate with their respective radio transceivers over network 112. Network 112 may include one or more public or private data networks. An example of network 112 may be the Internet.

Wireless devices, such as mobile phone 114 and wireless network adapter equipped computer 116, may establish wireless communications using radio networks provided by radio transceivers 106, 108, or 110. For example, mobile phone 114 may establish a session with a web application on server 118 using the radio network provided by radio transceiver 106.

Mobile phone 114 and wireless network adapter equipped computer 116 are only examples of a wide variety of wireless devices that may be used in conjunction with the illustrative embodiments. Server 118 may be any data processing system that is accessible over a data network.

Only as an example, and without implying any limitation to such architecture, FIG. 1 depicts certain components that are usable in an example implementation of an embodiment. For example, at least one of server 104, mobile phone 114, and wireless network adapter equipped computer 116 may include WIFI recommendation program 150, which analyzes WIFI parameters specific to the context in which a wireless device is used and automatically provides a set of preferred WIFI hotspots. In particular, WIFI recommendation program 150 may evaluate a plurality of factors such as pricing, connection speed, and connection duration in order to provide an optimal user connectivity experience and potentially reduce network subscription fees. Server 104 may include internal and external hardware components, as depicted and described in further detail with respect to FIG. 2.

Furthermore, home network provider's system 102 and transient network provider's system 104 are shown only as examples. Any number of wireless service providers may provide radio networks in adjoining, overlapping, or disjoint geographical areas in a similar manner. Additionally, any home network provider's system, transient network provider's system, radio transceiver, and wireless device may include or have access to a data processing system for implementing the illustrative embodiments.

FIG. 2 depicts a block diagram of a data processing system in which illustrative embodiments may be implemented. Data processing system 200 is an example of a computer, such as a server, a client, or another data processing capability for processing inputs from various input devices as described with respect to FIG. 1. Computer usable program code or instructions implementing the processes may be located in the computer for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIG. 2 and above-described examples are not meant to imply architectural limitations. For example, data processing system 200 also may be a tablet computer, laptop computer, or telephone device in addition to taking the form of a PDA. Data processing system 200 may also be a unit that may be portable or installable in an automobile.

FIG. 2 also represents an example data processing environment in which illustrative embodiments may be implemented. FIG. 2 is only an example and is not intended to assert or imply any limitation with regard to the environments in which different embodiments may be implemented. A particular implementation may make many modifications to the depicted environments based on the following description. The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

Figure 3:
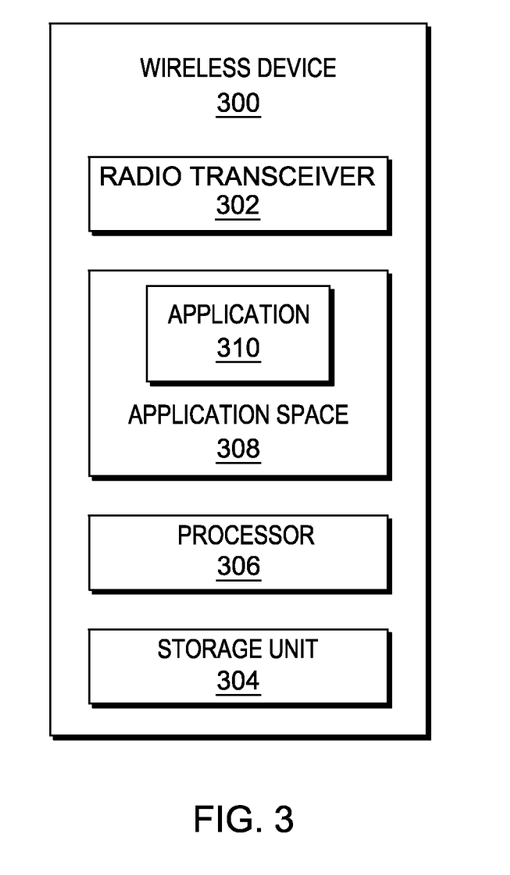
FIG. 3 depicts a block diagram of a wireless device in which the illustrative embodiments may be implemented.

FIG. 3 depicts a block diagram of a wireless device in which the illustrative embodiments may be implemented. Wireless device 300 may be any of mobile phone 114 or wireless network adapter equipped computer 116 in FIG. 1 or any other device capable of communicating wirelessly.

Wireless device 300 may include radio transceiver 302 for communicating wirelessly over a radio network. Storage unit 304 may be a memory or a persistent storage for data in wireless device 300. For example, in a mobile phone, the Subscriber Identity Module (SIM) card or the mobile phone's memory may serve as a storage unit 304. In some instances, such as when wireless device 300 is a laptop computer, storage unit 304 may be the hard disk drive, the main memory. Storage unit 304 may also be a removable storage unit, such as a flash memory.

Processor 306 may compute or manipulate data including the data used in a wireless communication. Application space 308 may be a memory space in wireless device 300 that processor 306 may use to execute one or more application 310. Application 310 may be a software application such as WIFI recommendation program 150 or a component thereof.

In one embodiment, application 310 may be the application that detects, identifies, negotiates, establishes, and uses access to radio networks according to the illustrative embodiments. In so performing, application 310 may use a set of information that may be available to wireless device 300.

The depicted examples in FIGS. 1-3 and above-described examples are not meant to imply architectural limitations. For example, data processing system 200 also may be a tablet computer, laptop computer, or telephone/smartphone device in addition to taking the form of a PDA.

Process for Determining a Preferred WIFI Hotspot

Figure 4:
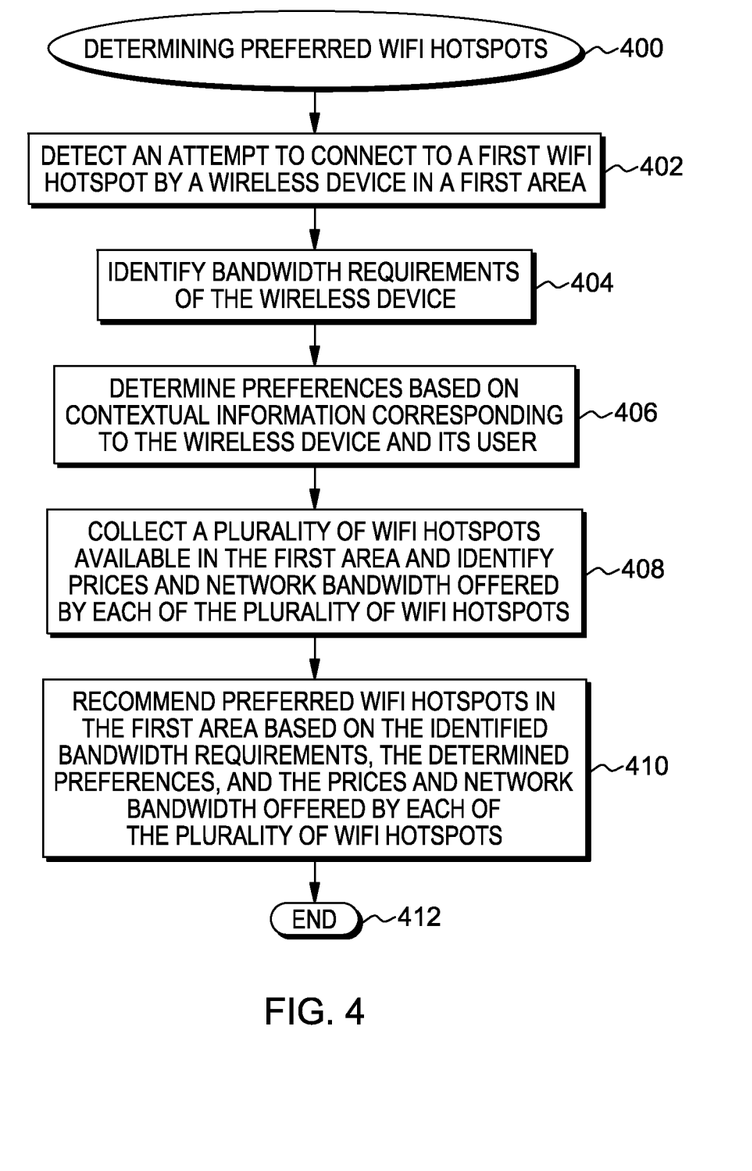
FIG. 4 depicts a flowchart of a process of determining a preferred WIFI hotspot in accordance with an illustrative embodiment.

FIG. 4 is a flowchart of a process of determining a preferred WIFI hotspot, where the process is implemented in the environment of FIG. 1 and system of FIGS. 2-3, in accordance with embodiments of the present invention. In the primary embodiment, it occurs when anytime a user is connecting to a network. The process of FIG. 4 begins at step 400. In step 402, WIFI recommendation program 150 (see FIG. 1) detects an attempt to connect with a first WIFI hotspot by a wireless device in a first area. As used herein, an attempt to connect is referred to as a wireless device surveying or scanning for available WIFI hotspots and should not be construed as establishing a connection through authentication, e.g., a wireless device latches onto a WIFI hotspot and provides authentication credentials to login and use the WIFI hotspot.

In step 404, WIFI recommendation program 150 (see FIG. 1) identifies bandwidth requirements of the wireless device, in response to the detected attempt for WIFI connection. In one embodiment, step 404 includes identifying the types of active applications in the wireless device within a predetermined range of time. In another embodiment, WIFI recommendation program 150 (see FIG. 1) adjusts bandwidth requirements of the wireless device by identifying a total bandwidth requirements of the wireless device then subsequently removing bandwidth requirements directed to all background processes or applications that do not require human interaction. In yet another embodiment, the bandwidth requirements in step 404 include background or synchronization processes in which WIFI recommendation program 150 (see FIG. 1) does not require human interaction. In this embodiment, background or synchronization processes include, but are not limited to, software or application downloads, software or application updates, local or cloud storage synchronization, web feeds such as Rich Site Summary ("RSS"), podcast applications that require audio or video synchronizations, and audiobook or eBook applications that require audio and text synchronizations. In yet another embodiment, WIFI recommendation program 150 identifies bandwidth requirements of applications or processes that were selected by the user prior to the wireless device attempting to connect with a first WIFI hotspot in the first area.

In step 406, WIFI recommendation program 150 (see FIG. 1) determines preferences based on contextual information corresponding to the wireless device and its user. In one embodiment, step 406 includes receiving current time and estimating time duration of how long the user will stay in the first area based, at least in part, on the user's next scheduled event from the user's calendar application or social media updates. In this embodiment, WIFI recommendation program 150 determines whether the event information extracted from the user's calendar application (e.g., face to face meeting, conference call, etc.) requires the user to leave the area in which WIFI hotspots are available. In one embodiment, contextual information in step 306 includes other sources of travel information (e.g. real time flight status change in departure time). In some embodiments, WIFI recommendation program 150 (see FIG. 1) allows user input, such as the user's planned mobile device activity (e.g., download a movie, check emails, etc.), in order to enhance the contextual information when establishing a connection to the WIFI hotspot.

In step 408, WIFI recommendation program 150 (see FIG. 1) collects a plurality of WIFI hotspots available in the first area and identifies prices and network bandwidth offered by each of the plurality of WIFI hotspots. In one embodiment, WIFI recommendation program 150 (FIG. 1) determines each network bandwidth by receiving bandwidth information from a service provider providing a WIFI hotspot. In an alternate embodiment, WIFI recommendation program 150 estimates network bandwidth for each of the plurality of WIFI hotspots by measuring a WIFI hotspot's network performance against the wireless device to which the user is attempting to connect. The alternate embodiment is described in more detail in the discussion of FIG. 5 herein below.

In step 410, WIFI recommendation program 150 (see FIG. 1) recommends preferred WIFI hotspots in the first area, based on the identified bandwidth requirements, the determined preferences, and the prices and network bandwidth offered by each of the plurality of WIFI hotspots. More specifically, WIFI recommendation program 150 (see FIG. 1) analyzes the determined user's location or temporal information in conjunction with the mobile device's bandwidth requirements and subsequently recommends a list of preferred WIFI hotspots or automatically connects to a most preferred WIFI hotspot in response to the analysis. In one embodiment, WIFI recommendation program 150 (see FIG. 1) ranks the available WIFI hotspots from the most preferred to least preferred based on identified bandwidth requirements, the determined preferences, and the prices and network bandwidth offered by each of the plurality of WIFI hotspots. In one embodiment, recommending preferred WIFI hotspots in step 310 includes providing the recommendations based, at least in part, on price per MB downloaded/uploaded, price per length of time during which a WIFI hotspot service is used, channel to which the WIFI SSID is tied, and a WIFI hotspot most capable in completing a task in progress within the allotted time. In one embodiment, WIFI recommendation program 150 (FIG. 1) displays the recommendation data adjacent to the service set identifier ("SSID") availability, network strength, and password lock for each of the WIFI hotspots in a display interface. In an alternate embodiment, WIFI recommendation program 150 (see FIG. 1) ranks the available WIFI hotspots based on the signal strength and available bandwidth of each available WIFI hotspot. For example, a first recommended WIFI hotspot having a strong signal and large bandwidth potential is ranked high, but a second recommended WIFI hotspot having a weak signal and small bandwidth potential is ranked lower relative to the first recommended WIFI hotspot. In this example, WIFI recommendation program 150 (see FIG. 1) may give more weight in the bandwidth potential than the signal strength, and vice versa.

In step 412, WIFI recommendation program 150 (see FIG. 1) terminates the process of determining a preferred WIFI hotspot.

Figure 5:
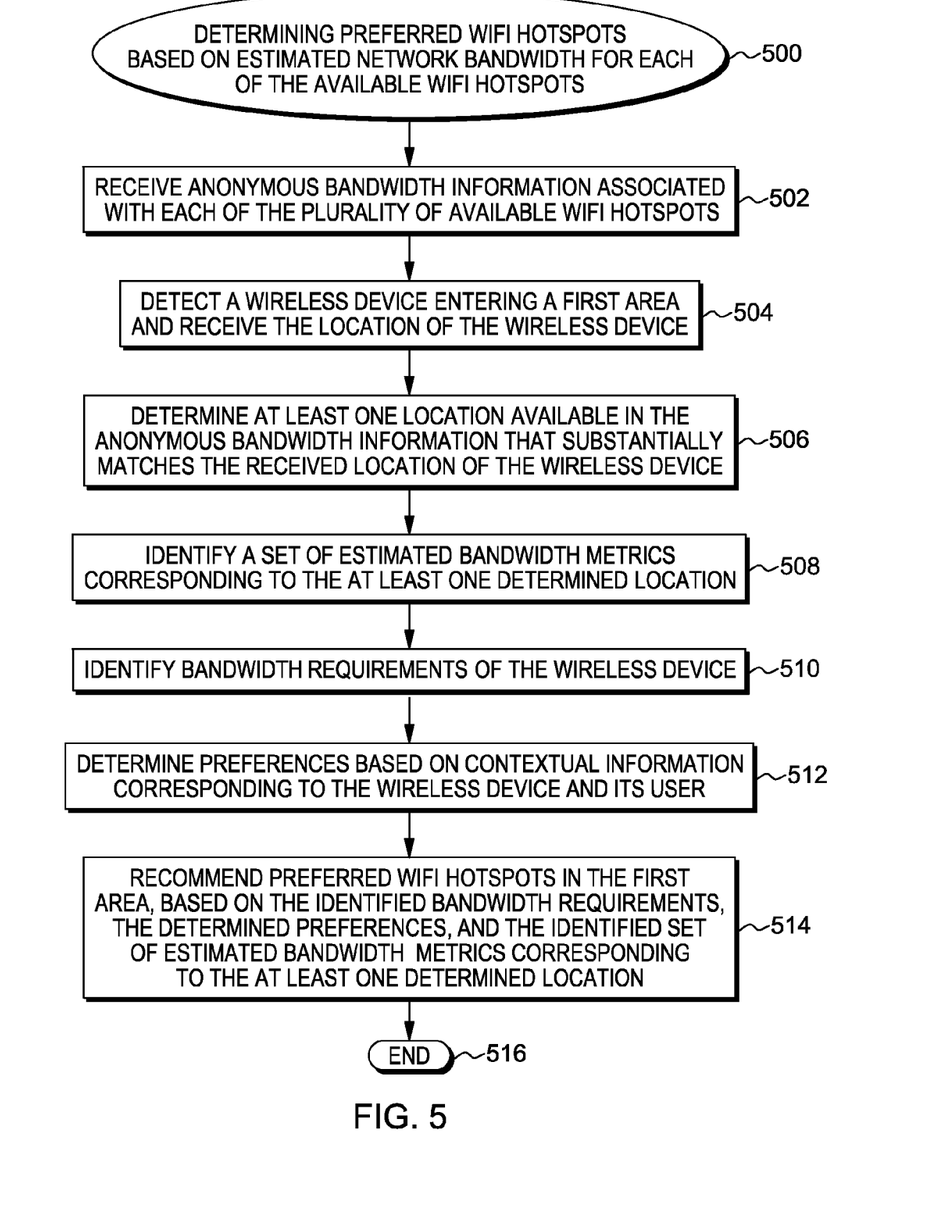
FIG. 5 depicts a flowchart of a process of determining a preferred WIFI hotspot based on estimated network bandwidth for each of the available WIFI hotspots in accordance with an illustrative embodiment.

FIG. 5 is a flowchart of a process of determining a preferred WIFI hotspot based on estimated network bandwidth for each of the available WIFI hotspots, where the process is implemented in the environment of FIG. 1 and system of FIGS. 2-3, in accordance with embodiments of the present invention. The process of FIG. 5 begins at step 500. In step 502, WIFI recommendation program 150 (see FIG. 1) receives anonymous bandwidth information associated with each of the plurality of available WIFI hotspots. In one embodiment, for each of the plurality of available WIFI hotspots, WIFI recommendation program 150 (see FIG. 1) estimates bandwidth metrics for at least one wireless device connected or had connected to each available WIFI hotspot and converts the estimated bandwidth metrics into anonymous bandwidth information. In this embodiment, the anonymous bandwidth information refers to actual and/or perceived bandwidth statistics from other users in the first area in which an attempt to connect with a first WIFI hotspot by a wireless device is detected. Further, WIFI recommendation program 150 (see FIG. 1) may offer the users to opt-in or opt-out as to whether they are willing to share their actual and/or perceived bandwidth statics or share feedback on the service provided by the WIFI hotspot. Accordingly, WIFI recommendation program 150 (see FIG. 1) may be able to use both published bandwidth statistics and the collected bandwidth statistics shared by the other users. As used herein, bandwidth metrics include, but are not limited to, signal strength, location information, including geographical coordinates, determined from a Global Positioning System ("GPS"), location information, including geographical coordinates, determined from an Indoor Positioning System ("IPS"), time when the WIFI connection was initiated, duration of the WIFI connection, and recorded bandwidth. In one embodiment, anonymous bandwidth information in step 502 is organized by a set of location information and bandwidth metrics corresponding to each of the set of location information.

In step 504, WIFI recommendation program 150 (see FIG. 1) detects a wireless device entering a first area and receives the location of the wireless device.

In step 506, WIFI recommendation program 150 (see FIG. 1) determines at least one location available in the anonymous bandwidth information that substantially matches the received location of the wireless device. In step 508, WIFI recommendation program 150 (see FIG. 1) identifies a set of estimated bandwidth metrics corresponding to the at least one determined location corresponding to each of the anonymous bandwidth information associated with each of the plurality of available WIFI hotspots.

In step 510, WIFI recommendation program 150 (see FIG. 1) identifies bandwidth requirements of the wireless device. In one embodiment, WIFI recommendation program 150 (see FIG. 1) identifies the bandwidth requirements in response to detecting the wireless device entering the first area. In another embodiment, WIFI recommendation program 150 (see FIG. 1) identifies the bandwidth requirements in response to the determining the at least one location corresponding to each of the anonymous bandwidth information associated with each of the plurality of available WIFI hotspots. In one embodiment, step 510 includes identifying the types of applications used by the user during a predetermined range of time. In another embodiment, WIFI recommendation program 150 (see FIG. 1) adjusts bandwidth requirements by identifying a total bandwidth requirements then subsequently removing all background processes or applications that used data from the wireless device, but did not require human interaction. In yet another embodiment, the bandwidth requirements in step 510 include background or synchronization processes in which WIFI recommendation program 150 (see FIG. 1) does not require human interaction. In this embodiment, background or synchronization processes include, but are not limited to, software or application downloads, software or application updates, local or cloud storage synchronization, web feeds such as Rich Site Summary ("RSS"), podcast applications that require audio or video synchronizations, and audiobook or eBook applications that require audio and text synchronizations. In yet another embodiment, WIFI recommendation program 150 identifies bandwidth requirements of applications or processes that were selected by the user prior to the attempt to connect with a first WIFI hotspot in the first area. In one embodiment, WIFI recommendation program 150 (see FIG. 1) estimates bandwidth metrics of the wireless devices, based on comparing real customers data sent with the SSID broadcast signal, and determines which WIFI network will provide the best bandwidth at the preferred cost.

In step 512, WIFI recommendation program 150 (see FIG. 1) determines preferences based on contextual information corresponding to the wireless device and its user. In one embodiment, step 512 includes receiving current time and determining time duration of how long the user will stay in the first area based, at least in part, on the user's next scheduled event from the user's calendar application or social media updates. In this embodiment, WIFI recommendation program 150 determines whether the location information (e.g., face to face meeting, conference call, etc.) requires the user to leave the area in which WIFI hotspots are available. In one embodiment, contextual information in step 410 includes other sources of travel information (e.g. real time flight status change in departure time). In some embodiments, WIFI recommendation program 150 (see FIG. 1) allows user input, such as the user's planned mobile device activity (e.g., download a movie, check emails, etc.), in order to enhance the user's context when establishing a connection to the WIFI hotspot.

In step 514, WIFI recommendation program 150 (see FIG. 1) recommends preferred WIFI hotspots in the first area, based on the identified bandwidth requirements, the determined preferences, and the identified set of estimated bandwidth metrics corresponding to the at least one determined location. More specifically, WIFI recommendation program 150 (see FIG. 1) analyzes the determined user's location or temporal information in conjunction with the mobile device's bandwidth requirements and the identified set of estimated bandwidth metrics corresponding to the at least one determined location, and subsequently recommends a list of preferred WIFI hotspots or automatically connects to a most preferred WIFI hotspot in response to the analysis. In one embodiment, WIFI recommendation program 150 (see FIG. 1) ranks the available WIFI hotspots from the most preferred to least preferred based on identified bandwidth requirements, the determined preferences, and the identified set of estimated bandwidth metrics corresponding to the at least one determined location. In one embodiment, recommending preferred WIFI hotspots in step 310 includes providing the recommendations based, at least in part, on price per MB downloaded/uploaded, price per length of time during which a WIFI hotspot service is used, a WIFI hotspot most capable in completing a task in progress within the allotted time. In one embodiment, WIFI recommendation program 150 (FIG. 1) displays the recommendation data adjacent to the service set identifier ("SSID") availability, network strength, and password lock for each of the WIFI hotspots in a display interface.

In step 516, WIFI recommendation program 150 (see FIG. 1) terminates the process of determining a preferred WIFI hotspot based on estimated network bandwidth for each of the available WIFI hotspots.

EXAMPLES

Figure 6:
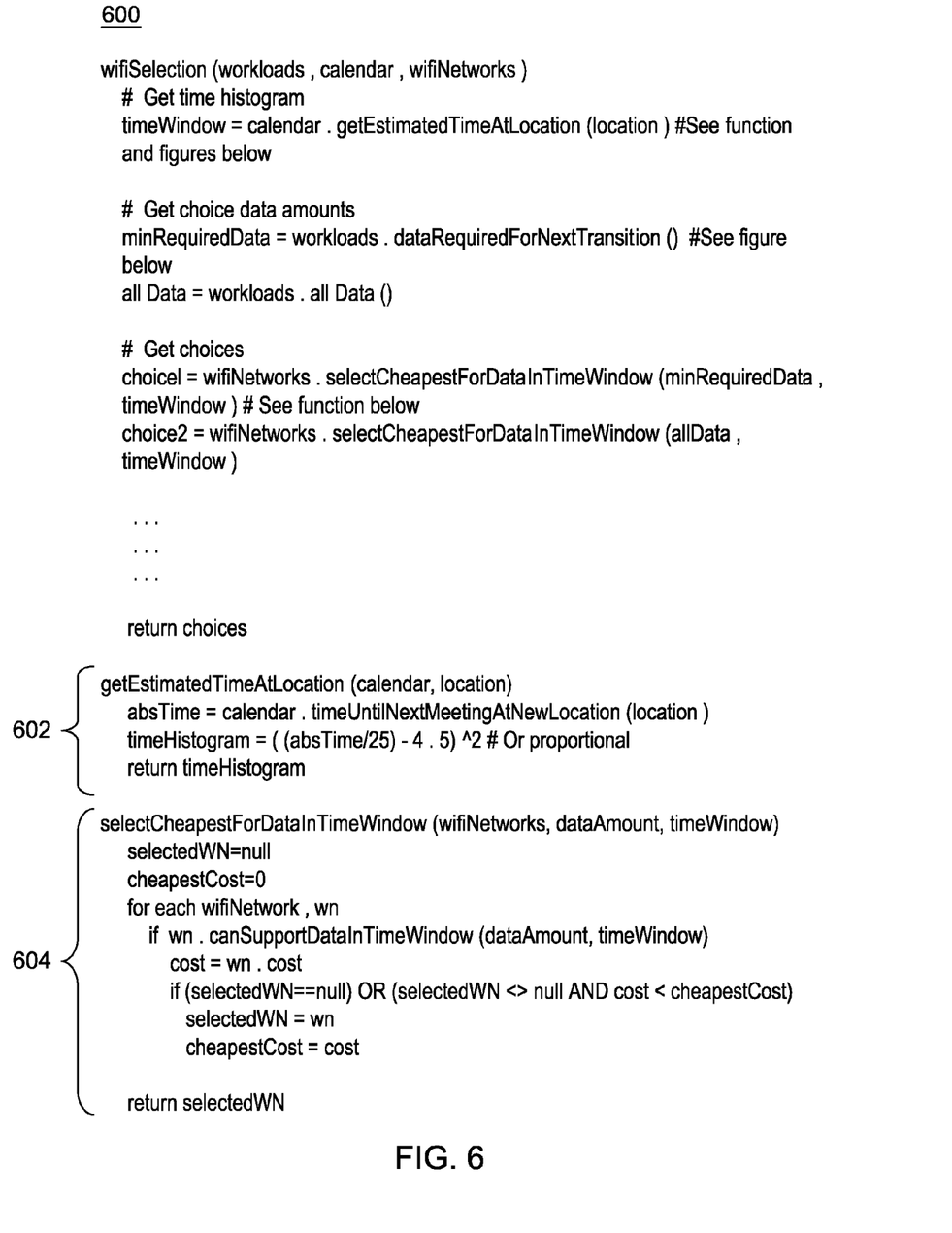
FIG. 6 depicts an exemplary algorithm that is used in the process of FIG. 3, in accordance with embodiments of the present invention.

FIG. 6 depicts an exemplary algorithm that is used in the process of FIG. 4, in accordance with embodiments of the present invention. In one embodiment, WIFI recommendation program 150 (see FIG. 1) instructs a computer processor to execute WIFI hotspot selection algorithm 600 shown in FIG. 6. WIFI hotspot selection algorithm 600 includes detecting an attempt to connect to a first WIFI hotspot by a wireless device in a first area, identifying bandwidth requirements of the wireless device, determining preferences based on contextual information corresponding to the wireless device and its user, collecting a plurality of WIFI hotspots available in the first area and identify prices and network bandwidth offered by each of the plurality of WIFI hotspots, and recommending preferred WIFI hotspots in the first area, based on the identified bandwidth requirements, the determined preferences, and the prices and network bandwidth offered by each of the plurality of the WIFI hotspots.

In one embodiment, WIFI hotspot selection algorithm 600 includes first sub-algorithm 602, which instructs WIFI recommendation program 150 (see FIG. 1) to determine preferences based on contextual information corresponding to the wireless device and its user. In another embodiment, WIFI hotspot selection algorithm 600 includes second sub-algorithm 604, which instructs WIFI recommendation program 150 (see FIG. 1) to recommend preferred WIFI hotspots in the first area, based on the identified bandwidth requirements, the determined preferences, and the prices and network bandwidth offered by each of the plurality of WIFI hotspots. It is noted that embodiments depicted in FIG. 6 are only examples and are not intended to assert or imply any limitation with regard to the environments in which different embodiments may be implemented. A particular implementation may make many modifications to the depicted environments is for exemplary purposes.

Figure 7:
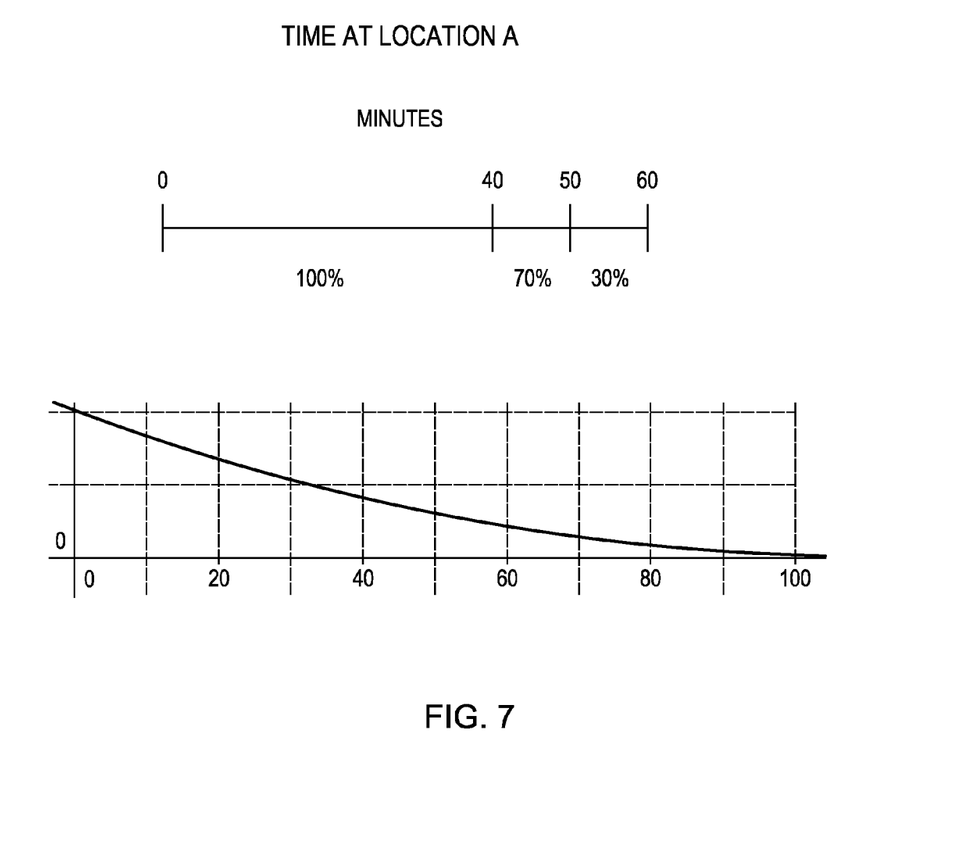
FIG. 7 depicts an exemplary graphical representation of determining preferences based on contextual information corresponding to the wireless device and its user, in accordance with embodiments of the present invention.

FIG. 7 depicts an exemplary graphical representation of determining preferences based on contextual information corresponding to the wireless device and its user, in accordance with embodiments of the present invention. In particular, FIG. 7 depicts an embodiment in which WIFI recommendation program 150 (see FIG. 1) receives current time and estimates how long the user will stay in the first area based, at least in part, on the user's next scheduled event from the user's calendar application or social media updates.

It is noted that embodiments depicted and numerical ranges (e.g., percentage numbers) set forth in FIG. 7 are only examples and are not intended to assert or imply any limitation with regard to the environments in which different embodiments may be implemented. A particular implementation may make many modifications to the depicted environments is for exemplary purposes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining preferred WIFI hotspots, the method comprising:
   detecting, by a computer processor, an attempt to connect to a first WIFI hotspot by a wireless device in a first area; and
   in response to detecting the attempt to connect to the first WIFI hotspot:
   receiving, across a computer network, socket parameters extracted from the wireless device, the socket parameters based on network packets originating from background computer sockets executing in the wireless device during a predetermined period of time and from storage synchronization application sockets that require storing bytes of data in a remote server;

identifying, by the computer processor, at least one bandwidth requirement of the wireless device based on the socket parameters extracted from the wireless device;

determining, by the computer processor, preferences based on contextual information corresponding to the wireless device and its user;

collecting, by the computer processor, a plurality of WIFI hotspots available in the first area and identify network bandwidth and network throughput capable of being provided by each of the plurality of WIFI hotspots; and constructing, by the computer processor, a device readable message that causes a graphic user interface (GUI) of the wireless device to display preferred WIFI hotspots in the first area based on the identified bandwidth requirements, the determined preferences, and the network bandwidth and the network throughput capable of being provided by each of the plurality of WIFI hotspots.

2. The method according to claim 1, wherein identifying at least one bandwidth requirement of the wireless device further comprises adjusting the at least one bandwidth requirements by identifying an initial bandwidth requirement then subsequently removing a subset of the identified initial bandwidth requirement directed to all of the background computer sockets executing in the wireless device.

3. The method according to claim 2, wherein the background computer sockets executing in the wireless device comprise application downloads or updates.

4. The method according to claim 1, wherein determining preferences based on contextual information corresponding to the wireless device and its user further comprises determining, by the computer processor, time duration of how long the user will stay in the first area based, at least in part, on a next scheduled event indicated from a calendar application or social media network updates associated with the user.

5. The method according to claim 1, wherein the device readable message further includes a ranking of
the preferred WIFI hotspots from most preferred to least preferred based on identified bandwidth requirements, the determined preferences, and the network bandwidth and the network throughput capable of being provided by the each of the plurality of WIFI hotspots.

6. A computer program product for determining preferred WIFI hotspots, the computer program product comprising:
one or more computer readable storage medium and program instructions stored on the one or more computer readable storage medium, the program instructions comprising:
program instructions to detect an attempt to connect to a first WIFI hotspot by a wireless device in a first area;
program instructions to receive, across a computer network, socket parameters extracted from the wireless device, the socket parameters based on network packets originating from background computer sockets executing in the wireless device during a predetermined period of time and from storage synchronization application sockets that require storing bytes of data in a remote server, in response to detecting the attempt to connect to the first WIFI hotspot;

program instructions to identify at least one bandwidth requirement of the wireless device based on the socket parameters extracted from the wireless device, in response to detecting the attempt to connect to the first WIFI hotspot;

program instructions to determine preferences based on contextual information corresponding to the wireless device and its user, in response to detecting the attempt to connect to the first WIFI hotspot;

program instructions to collect a plurality of WIFI hotspots available in the first area and identify network bandwidth and network throughput capable of being provided by each of the plurality of WIFI hotspots, in response to detecting the attempt to connect to the first WIFI hotspot; and program instructions to construct a device readable message that causes a graphic user interface (GUI) of the wireless device to display preferred WIFI hotspots in the first area based on the identified bandwidth requirements, the determined preferences, and the network bandwidth and the network throughput capable of being provided by each of the plurality of WIFI hotspots.

7. The computer program product according to claim 6, wherein program instructions to identify at least one bandwidth requirement of the wireless device further comprises:
program instructions to adjust the at least one bandwidth requirements by identifying an initial bandwidth requirement then subsequently removing a subset of the identified initial bandwidth requirement directed to all of the background computer sockets executing in the wireless device.

8. The computer program product according to claim 7, wherein the background computer sockets executing in the wireless device comprise application downloads or updates.

9. The computer program product according to claim 6, wherein program instructions to determine preferences based on contextual information corresponding to the wireless device and its user further comprises:
program instructions to determine time duration of how long the user will stay in the first area based, at least in part, on a next scheduled event indicated from a calendar application or social media network updates associated with the user.

10. The computer program product according to claim 6, wherein the device readable message further includes a ranking of the preferred WIFI hotspots from most preferred to least preferred based on identified bandwidth requirements, the determined preferences, and the network bandwidth and the network throughput capable of being provided by the each of the plurality of WIFI hotspots.

11. A computer program product for determining preferred WIFI hotspots, the computer program product comprising:
one or more computer readable storage medium and program instructions stored on the one or more computer readable storage medium, the program instructions comprising:
program instructions to detect an attempt to connect to a first WIFI hotspot by a wireless device in a first area;
program instructions to receive, across a computer network, socket parameters extracted from the wireless device, the socket parameters based on network packets originating from background computer sockets executing in the wireless device during a predetermined period of time and from storage synchronization application sockets that require storing bytes of data in a remote server, in response to detecting the attempt to connect to the first WIFI hotspot;

program instructions to identify at least one bandwidth requirement of the wireless device based on the socket parameters extracted from the wireless device, in response to detecting the attempt to connect to the first WIFI hotspot;

program instructions to determine preferences based on contextual information corresponding to the wireless device and its user, in response to detecting the attempt to connect to the first WIFI hotspot;

program instructions to collect a plurality of WIFI hotspots available in the first area and identify network bandwidth and network throughput capable of being provided by each of the plurality of WIFI hotspots, in response to detecting the attempt to connect to the first WIFI hotspot; and program instructions to construct a device readable message that causes a graphic user interface (GUI) of the wireless device to display preferred WIFI hotspots in the first area based on the identified bandwidth requirements, the determined preferences, and the network bandwidth and the network throughput capable of being provided by each of the plurality of WIFI hotspots.

12. The computer program product according to claim 11, wherein program instructions to identify at least one bandwidth requirement of the wireless device further comprises:
program instructions to adjust the at least one bandwidth requirements by identifying an initial bandwidth requirement then subsequently removing a subset of the identified initial bandwidth requirement directed to all of the background computer sockets executing in the wireless device.

13. The computer program product according to claim 12, wherein the background computer sockets executing in the wireless device comprise application downloads or updates.

14. The computer program product according to claim 11, wherein program instructions to determine preferences based on contextual information corresponding to the wireless device and its user further comprises:
program instructions to determine time duration of how long the user will stay in the first area based, at least in part, on a next scheduled event indicated from a calendar application or social media network updates associated with the user.

15. The computer program product according to claim 11, wherein the device readable message further includes a ranking of the preferred WIFI hotspots from most preferred to least preferred based on identified bandwidth requirements, the determined preferences, and the network bandwidth and the network throughput capable of being provided by the each of the plurality of WIFI hotspots.

* * * * *